3,393,230
A-NORSTEROIDS
Josef Fried, Princeton, N.J., assignor, by mesne assignments, to E. R. Squibb & Sons, Inc., New York, N.Y., a corporation of Delaware
No Drawing. Filed Sept. 13, 1963, Ser. No. 308,693
The portion of the term of the patent subsequent to Feb. 23, 1982, has been disclaimed and dedicated to the Public
1 Claim. (Cl. 260—488)

ABSTRACT OF THE DISCLOSURE

This invention relates to a novel compound having the formulae

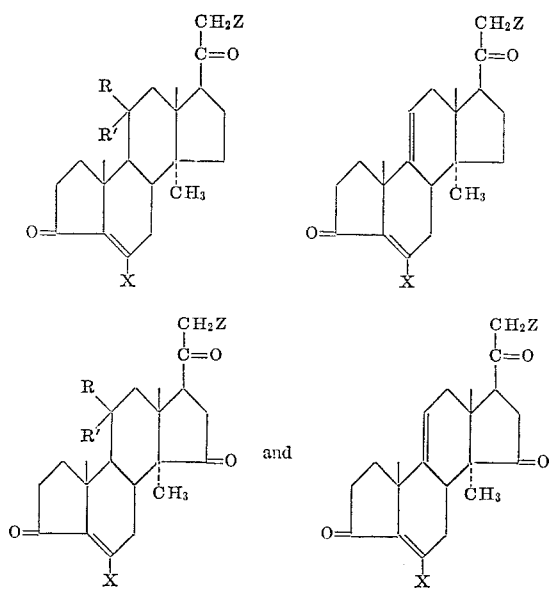

wherein X is lower alkyl; R is hydrogen; R' is hydroxy; and together R and R' is oxo (O=); and Z is selected from the group consisting of hydrogen, hydroxy, halogen and acyloxy wherein the acyl radical is of a hydrocarbon carboxylic acid of less than twelve carbon atoms. These compounds possess anti-androgenic activity and thus may be employed in the treatment of hyperandrogenic acne.

---

This invention relates to and has for its objects the provision of new physiologically active steroids, methods for their production, and novel intermediates useful in the preparation thereof.

The novel final products of the instant invention may be represented by the formulae

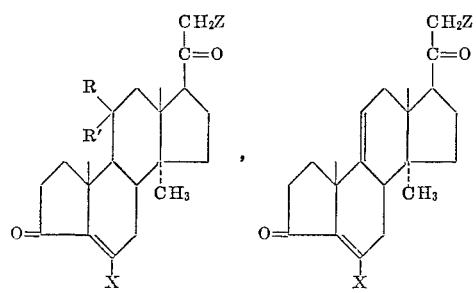

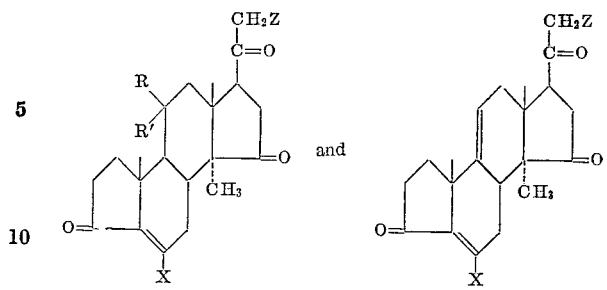

wherein R is hydrogen; R' is hydroxy; and together R and R' is oxo (O=); X is lower alkyl (e.g. methyl) and Z is selected from the group consisting of hydrogen, hydroxy, acyloxy and halogen (e.g. chloro, fluoro, bromo or iodo).

The preferred acyloxy radicals are those of hydrocarbon carboxylic acids of less than twelve carbon atoms, as exemplified by the lower alkanoic acids (e.g. acetic, propionic, butyric and tert.-pentonic acid), the lower alkenoic acids, the monocyclic aryl carboxylic acids (e.g. benzoic and toluic acid), the monocyclic aryl lower alkanoic acids (e.g. phenacetic and β-phenylpropionic acid), the cycloalkane carboxylic acids and the cycloalkene carboxylic acids.

The products of this invention are physiologically active compounds which possess antiandrogenic activity and thus may be employed in the treatment of hyperandrogenic acne, for which purpose they may be administered, the dosage being adjusted for the relative potency of the particular steroid and the requirements of the patient.

The final products of this invention may be prepared by the processes of this invention, which entail a number of steps starting with the compounds represented by the following formulae

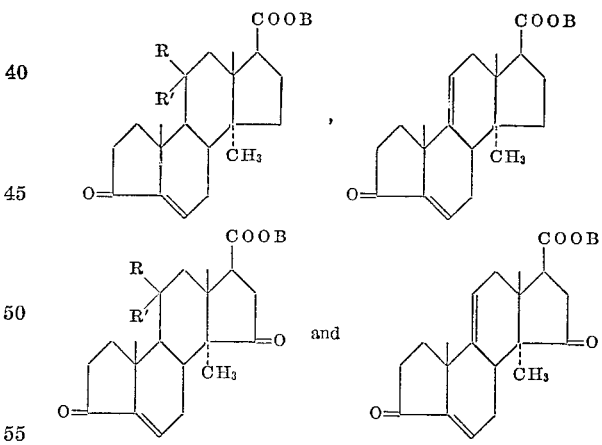

wherein B is lower alkyl and R and R' are as hereinbefore defined. The compounds which may be employed as starting materials in the practice of this invention may be prepared according to the procedures set forth in my copending applications Ser. No. 212,154, filed July 24, 1962, now Patent No. 3,170,919 and Ser. No. (K358) filed on even date herewith, now Patent No. 3,271,390, and include such compounds as methyl 14-methyl-A-nor-$\Delta^5$-androstene-3,11-dione-17β-carboxylate; methyl 14-methyl-A-nor-$\Delta^{5,9(11)}$-androstadiene-3-one-17β-carboxylate; methyl 14-methyl-A-nor-$\Delta^5$-androstene-11β-ol-3-one-17β-carboxylate; methyl 14-methyl-A-nor-$\Delta^5$-androstene-3,11,15-trione-17β-carboxylate; methyl 14-methyl-A-nor-$\Delta^{5,9(11)}$-androstadiene-3,15-dione-17β-carboxylate; and methyl 14-methyl-A-nor-$\Delta^5$-androstene-11β-ol-3,15-dione-17β-carboxylate.

The process of the instant invention may be represented by the following equations, wherein X, R, R' and Z are as hereinbefore defined:

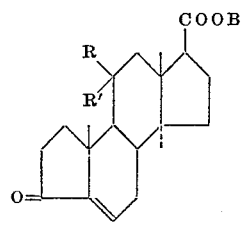

A

I   B=CH₃; R'=OH; R=H
II  B=CH₃; R & R'=O=

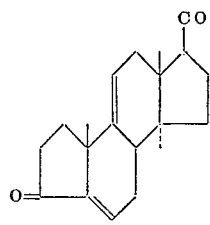

B

III B=CH₃

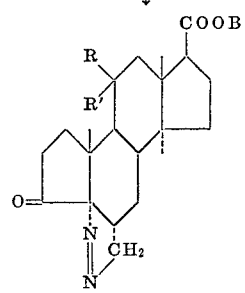

C

IV  B=CH₃; R=H; R'=OH
V   B=CH₃; R & R'=O=

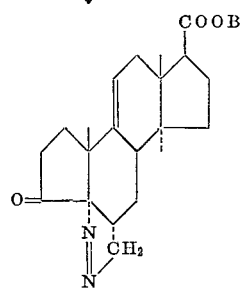

D

VI  B=CH₃

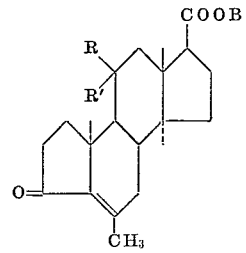

E

VII  B=CH₃; R=H; R'=OH
VIII B=CH₃; R & R'=O=

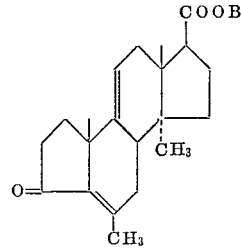

F

IX  B=CH₃

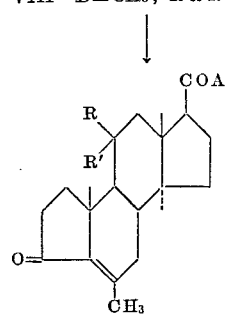

G

X   R=H; R'=OH; A=halide (Cl, Br)
XI  R & R'=O=; A=halide (Cl, Br)

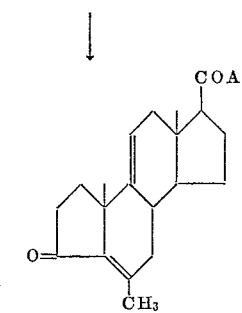

H

XII A=halide (Cl, Br)

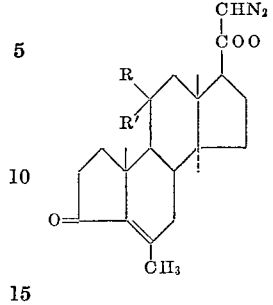

J

XIII R=H; R'=OH
XIV  R & R'=O=

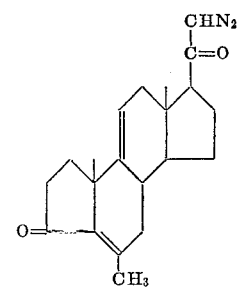

K

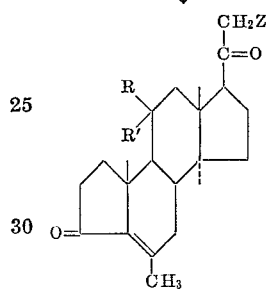

L

XV    Z=H; R=H; R=OH
XVI   Z=OH; R=H; R=OH
XVII  Z=CH₃COO; R=H; R=OH
XVIII Z=halide; R=H; R=OH
XIX   Z=H; R & R'=O=
XX    Z=OH; R & R'=O=
XXI   Z=halide; R & R'=O=
XXII  Z=CH₃COO; R & R'=O=

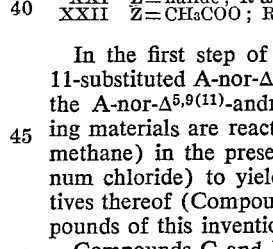

M

XXIII Z=halide
XXIV  Z=H
XXV   Z=OH
XXVI  Z=CH₃COO

In the first step of the process of this invention, the 11-substituted A-nor-Δ⁵-androstenes (Compounds A) and the A-nor-Δ⁵,⁹⁽¹¹⁾-androstadienes (Compounds B) starting materials are reacted with a diazoalkane (e.g. diazomethane) in the presence of a metal halide (e.g. aluminum chloride) to yield the respective pyrazoline derivatives thereof (Compounds C and D) which are new compounds of this invention.

Compounds C and D may then be heated at temperatures above their respective melting points to yield the respective 6-methyl-Δ⁵-androstene (Compounds E) and the 6-methyl-Δ⁵,⁹⁽¹¹⁾-androstadienes (Compounds F), which are also new compounds of this invention.

Compounds E and F may then be treated with an acid halide, for example, oxalyl chloride, to obtain the corresponding 11-substituted 6-methyl-A-nor-Δ⁵-androstene-17-carboxylic acid halides (Compounds G) and the 6-methyl-A-nor-Δ⁵,⁹⁽¹¹⁾-androstadiene-17-carboxylic acid chlorides (Compounds H) respectively, which are also new compounds of this invention.

These acid chloride compounds (Compounds G and H) are then converted to their respective diazoketone-6-methyl-A-nor-Δ⁵-pregnenes (Compounds J) and diazoketone-6-methyl-A-nor-Δ⁵,⁹⁽¹¹⁾-pregnadienes (Compounds K), which are also new compounds of this invention, by treatment with an ethereal solution of diazomethane.

In order to obtain the final products of this invention which are oxygenated in the 21-position (i.e. Z is acyloxy or hydroxy). Compounds J and K are treated at elevated temperature with a fatty acid, for example, acetic, propionic or butyric acid, to yield the 21-esters of 11-substituted-6-methyl-A-nor-Δ⁵-pregnenes (Compounds L) and 6-methyl-A-nor-Δ⁵,⁹⁽¹¹⁾-pregnadienes (Compounds M), which are also new compounds of this invention. Alternatively, Compounds L and M (wherein Z is acyloxy) may be obtained by first treating Compounds J and K with a hydrohalide, for example, hydrochloric acid, to yield the 21-halogenated-A-nor-pregnenes (Compounds L and M, wherein Z is halide), which are also new compounds of this invention, and then substituting the 21-halide-A-nor-pregnenes as by treatment with potassium iodide and potassium acetate to yield the respective 21-acyloxy-A-nor-pregnenes (Compounds L and M). To obtain the 21-hydroxy-A-nor-pregnene compounds of this invention (Compounds L and M, wherein Z is hydroxy), the 21-acyloxy compounds are treated with a base, such as potassium carbonate. The 21-hydroxy-6-methyl-A-nor-pregnenes (Compounds L and M, wherein Z is hydroxy) are also new compounds of this invention.

To obtain the final compounds of this invention, which are not oxygenated in the 21-position (i.e. wherein Z is hydrogen or halogen), Compounds J and K are first treated with hydriodic acid to yield the 21-unsubstituted-A-nor-pregnenes (Compounds L and M, wherein Z is hydrogen), which are also new compounds of this invention.

The 21-halogenated compounds are obtained as set forth hereinabove, i.e., by treatment of Compounds J and K with a hydrohalide, e.g., hydrochloric acid. It should be noted that when the 15-keto starting materials are employed in the practice of this invention, the final products thereof and the intermediates produced thereby will all be the 15-keto derivatives of the compounds set forth hereinabove. These compounds are also new compounds of this invention.

The invention may be further illustrated by the following examples:

Example 1.—Methyl 14-methyl-5,6-pyrazolino-A-norandrostane-3,11-dione-17β-carboxylate (II)

To a suspension of 50 mg. of finely powdered methyl 14 - methyl - A - nor - $\Delta^5$ - androstene - 3,11 - dione-17β-carboxylate (I) in 30 ml. of ethereal diazomethane solution is added at room temperature, in portions, a total of 20 mg. of aluminum chloride which had been aged by leaving it exposed to the atmosphere for 5–10 minutes. The total reaction time is one hour and thirty minutes. The excess diazomethane is then destroyed by the addition of two drops of glacial acetic. The mixture is washed with water and the ether extract evaporated to dryness in vacuo. The resulting residual mixture is purified by preparative thin layer chromatography on activity V neutral alumina using chloroform as the moving phase. Two zones are obtained, designated as "A" and "B". The elution of zone A furnishes after concentration 21 mg. of material, M.P. 200–201°, which is identified as starting material. Elution of zone B furnishes after crystallization from methanol 9 mg. of methyl 14-methyl - 5,6 - pyrazolino - A - norandrostane - 3,11-dione-17β-carboxylate which melts with decomposition at 176–178°; $[\alpha]_D^{23}$+360° (c., 0.28 in chloroform);

$\lambda_{max.}^{KBr}$ 5.79, 5.87, 6.53μ

Analysis.—Calcd. for $C_{22}H_{30}O_4N_2$ (386.48): C, 68.37; H, 7.82. Found: C, 68.43; H, 7.81.

Example 2.—Methyl 14-methyl-5,6-pyrazolino-A-nor-$\Delta^{9(11)}$-androstene-3-one-17β-carboxylate Following the procedure set forth in Example 1 but substituting an equivalent amount of methyl 14-methyl - A - nor - $\Delta^{5,9(11)}$ - androstadiene - 3 - one - 17β-carboxylate for methyl 14 - methyl - A - nor - $\Delta^5$ - androstene-3,11-dione-17β-carboxylate, there is obtained methyl 14 - methyl - 5,6 - pyrazolino - A - nor - $\Delta^{9(11)}$-androstene-3-one-17β-carboxylate.

Example 3.—Methyl 14-methyl-5,6-pyrazolino-A-nor-androstane-11β-ol-3-one-17β-carboxylate Following the procedure set forth in Example 1, but substituting an equivalent amount of methyl 14-methyl-A-nor-$\Delta^5$-androstene-11β-ol-3 - one - 17β - carboxylate for methyl 14 - methyl - A - nor - $\Delta^5$ - androstene - 3,11-dione-17β-carboxylate, there is obtained methyl 14-methyl - 5,6 - pyrazolino - A - norandrostane - 11β - ol - 3-one-17β-carboxylate.

Example 4.—Methyl 6,14-dimethyl-A-nor-$\Delta^5$-androstene-3,11-dione-17β-carboxylate (III)

Five mg. of methyl 14 - methyl - 5,6 - pyrazolino - A-norandrostane - 3,11 - dione - 17β - carboxylate (II) was placed into an evacuated tube and heated in a bath at a temperature of 150–170°. The contents of the tube melts and sublimed to colder portions. The tube is then cooled, the bottom cut off and the sublimate recrystallized from methanol. The pure methyl 6,14 - dimethyl - A - nor - $\Delta^5$-androstene - 3,11 - dione - 17β - carboxylate (III) melts at 172–174°;

$\lambda_{max.}^{methanol}$ 255 mμ (ε=8,600); $\lambda_{max.}^{KBr}$ 5.75, 5.86, 6.10μ

Example 5.—Methyl 6,14-dimethyl-A-nor-$\Delta^{5,9(11)}$-androstadiene-3-one-17β-carboxylate Following the procedure set forth in Example 4 but substituting an equivalent amount of methyl 14-methyl-5,6-pyrazolino-A-nor-$\Delta^{9,(11)}$-androstene - 17β - carboxylate for methyl 14 - methyl-5,6-pyrazolino-A-norandrostane-3,11 - dione-17β-carboxylate, there is obtained methyl 6,14-dimethyl-A-nor - $\Delta^{5,9(11)}$ - androstadiene-3-one-17β-carboxylate.

Example 6.—Methyl 6,14-dimethyl-A-nor-$\Delta^5$-androstene-11β-ol-3-one-17β-carboxylate Following the procedure set forth in Example 4, but substituting an equivalent amount of methyl 14-methyl-5,6 - pyrazolino - A - nor-$\Delta^5$-androstene-11β-ol-3-one-17β-carboxylate for methyl 14-methyl-A-nor-$\Delta^5$-androstene-3,20-dione-17β-carboxylate, there is obtained methyl 6,14-dimethyl-A-nor - $\Delta^5$ - androstene - 11β - ol - 3 - one-17β-carboxylate.

Example 7.—6,14-dimethyl-A-nor-$\Delta^5$-androstene-3,11-dione-17β-carboxylic acid To a mixture of KOH in methanol and water, which has been refluxed for 10 minutes and cooled under a blanket of helium is added methyl 6,14-dimethyl-A-nor-$\Delta^5$-androstene-3,11-dione-17β-carboxylate and the resulting solution is refluxed under a blanket of helium. The mixture is then cooled and after the addition of glacial acetic acid is diluted with water. After the removal of the bulk of the methanol in vacuo the 6,14-dimethyl-A-nor-$\Delta^5$-androstene-3,11-dione-17β-carboxylic acid crystallizes and is filtered and washed with water.

Example 8.—6,14-dimethyl-A-nor-$\Delta^{5,9(11)}$-androstadiene-3-one-17β-carboxylic acid Following the procedure set forth in Example 7 but substituting an equivalent amount of methyl 6,14-dimethyl-A-nor-$\Delta^{5,9(11)}$-androstadiene - 3 - one-17β-carboxylate for methyl 6,14-dimethyl-A-nor-$\Delta^5$-androstene - 3,11 - dione-17β-carboxylate, there is obtained 6,14-dimethyl-A-nor-$\Delta^{5,9(11)}$-androstadiene-3-one-17β-carboxylic acid.

Example 9.—6,14-dimethyl-A-nor-$\Delta^5$-androstene-11β-ol-3-one-19β-carboxylic acid Following the procedure in Example 7 but substituting an equivalent amount of methyl 6,14-dimethyl-A-nor-$\Delta^5$-androstene-11β-ol-3-one-17β-carboxylate for methyl 6,14-dimethyl-A-nor-$\Delta^5$-androstene-3,11-dione-17β-carboxylate, there is obtained 6,14-dimethyl-A-nor-$\Delta^5$-androstene-11β-ol-3-one-19β-carboxylic acid.

Example 10.—6,14-dimethyl-A-nor-Δ⁵-androstene-3,11-dione-17β-carboxylic acid chloride To a suspension of vacuum dried 6,14-dimethyl-A-nor-Δ⁵-androstene - 3,11 - dione-17β-carboxylic acid in anhydrous benzene is added with stirring redistilled oxalyl chloride. After 30 minutes all the acid has dissolved and the solution is allowed to remain at room temperature for an additional 40 minutes. Upon the removal of the solvent in vacuo there remains a crystalline solid to which is added anhydrous benzene and the latter removed again in vacuo, thus yielding 6,14-dimethyl-A-nor-Δ⁵-androstene-3,11-dione-17β-carboxylic acid chloride.

Example 11.—6,14-dimethyl-A-nor-Δ⁵,⁹⁽¹¹⁾-androstadiene-3-one-17β-carboxylic acid chloride Following the procedure set forth in Example 10 but substituting an equivalent amount of 6,14-dimethyl-A-nor-Δ⁵,⁹⁽¹¹⁾-androstadiene-3-one-17β-carboxylic acid for 6,14-dimethyl-A-nor-Δ⁵-androstene - 3,11 - dione-17β-carboxylic acid there is obtained 6,14-dimethyl-A-nor-Δ⁵,⁹⁽¹¹⁾-androstadiene-3-one-17β-carboxylic acid chloride.

Example 12.—6,14-dimethyl-A-nor-Δ⁵-androstene-11β-ol-3-one-17β-carboxylic acid chloride Following the procedure set forth in Example 10 but substituting an equivalent amount of 6,14-dimethyl-A-nor - Δ⁵ - androstene-11β-ol-3-one-17β-carboxylic acid for 6,14-dimethyl-A-nor-Δ⁵-androstene - 3,11 - dione-17β-carboxylic acid there is obtained 6,14-dimethyl-A-nor-Δ⁵-androstene-11β-ol-3-one-17β-carboxylic acid chloride.

Example 13.—6,14-dimethyl-21-diazo-A-nor-Δ⁵-pregnene-3,11,20-trione

A solution of 6,14-dimethyl-A-nor-Δ⁵-androstene-3,11-dione-17β-carboxylic acid chloride in anhydrous benzene is added at 0° C. to a concentrated distilled solution of diazomethane in ether. The mixture is allowed to warm up to room temperature and after a total reaction time of 1½ hours it is filtered from flocculent polyethylene and evaporated to dryness in vacuo. The resulting crystalline residue is recrystallized from methanol and furnishes 6,14-dimethyl-21-diazo-A-nor-Δ⁵-pregnene-3,11,20-trione.

Example 14.—6,14-dimethyl-21-diazo-A-nor-Δ⁵,⁹⁽¹¹⁾-pregnadiene-3,20-dione

Following the procedure set forth in Example 13 but substituting an equivalent amount of 6,14-dimethyl-A-nor-Δ⁵,⁹⁽¹¹⁾-androstadiene-3-one-17β-carboxylic acid chloride for 6,14-dimethyl-A-nor-Δ⁵-androstene - 3,11 - dione-17β-carboxylic acid chloride there is obtained 6,14-dimethyl-21-diazo-A-nor-Δ⁵,⁹⁽¹¹⁾-pregnadiene-3,20-dione.

Example 15.—6,14-dimethyl-21-diazo-A-nor-Δ⁵-pregnene-11β-ol-3,20-dione

Following the procedure set forth in Example 13 but substituting an equivalent amount of 6,14-dimethyl-A-nor-Δ⁵-androstene-11β-ol-3-one-17β-carboxylic acid chloride for 6,14-dimethyl-A-nor-Δ⁵-androstene-3,11-dione-17β-carboxylic acid chloride there is obtained 6,14-dimethyl-21-diazo-A-nor-Δ⁵-pregnene-11β-ol-3,20-dione.

Example 16.—6,14-dimethyl-21-chloro-A-nor-Δ⁵-pregnene-3,11,20-trione

To a solution of 6,14-dimethyl-21-diazo-A-nor-Δ⁵-pregnene-3,11-20-trione is added at 0° C. a saturated solution of hydrogen chloride in chloroform. The mixture is allowed to remain at 0° C. for 20 minutes after which time it is extracted with dilute sodium bicarbonate. The chloroform extract is dried over sodium sulfate, evaporated to dryness and the residual crystalline recrystallized from methanol yielding 6,14-dimethyl-21-chloro-A-nor-Δ⁵-pregnene-3,11,20-trione.

Similarly, following the procedure of Example 16 but substituting hydrogen bromide for the hydrogen chloride there is obtained 6,14-dimethyl-21-bromo-A-nor-Δ⁵-pregnene-3,11,20-trione.

Similarly, when a limited amount of hydrogen iodide is substituted for the hydrogen chloride, 6,14-dimethyl-21-iodo-A-nor-Δ⁵-pregnene-3,11,20-trione is obtained.

Example 17.—6,14-dimethyl-21-chloro-A-nor-Δ⁵,⁹⁽¹¹⁾-pregnadiene-3,20-dione

Following the procedure set forth in Example 16 but substituting an equivalent amount of 6,14-dimethyl-21-diazo-A-nor-Δ⁵,⁹⁽¹¹⁾-pregnadiene-3,20-dione for 6,14-dimethyl-21-diazo-A-nor-Δ⁵-pregnene-3,11,20-trione there is obtained 6,14 - dimethyl-21-chloro-A-nor-Δ⁵,⁹⁽¹¹⁾pregnadiene-3,20-dione.

Example 18.—6,14-dimethyl-21-chloro-A-nor-Δ⁵-pregnene-11β-ol-3,20-dione

Following the procedure set forth in Example 16 but substituting an equivalent amount of 6,14-dimethyl-21-diazo-A-nor-Δ⁵-pregnene-11β-ol-3,20-dione for 6,14-dimethyl-21-diazo-A-nor-Δ⁵-pregnene-3,11,20-trione there is obtained 6,14 - dimethyl-21-chloro-A-nor-Δ⁵-pregnenediene-3,20-dione.

Example 19.—6,14-dimethyl-A-nor-Δ⁵-pregnene-3,11,20-trione

To a solution of 6,14-dimethyl-21-diazo-A-nor-Δ⁵-pregnene - 3,11,20 - trione in chloroform is added under a blanket of carbon dioxide freshly distilled aqueous hydriodic acid. The mixture is thoroughly mixed by shaking for 3 minutes at room temperature, poured into water and chloroform and the chloroform solution extracted with dilute sodium bicarbonate with the addition of a small amount of sodium bisulfite. The chloroform extract is then washed with water, dried over sodium sulfate and evaporated to dryness in vacuo and the residue crystallized from methanol to yield 6,14-dimethyl-A-nor-Δ⁵-pregnene-3,11,20-trione.

Example 20.—6,14-dimethyl-A-nor-Δ⁵,⁹⁽¹¹⁾-pregnadiene-3,20-dione

Following the procedure set forth in Example 19 but substituting 6,14-dimethyl-21-diazo-A-nor-Δ⁵,⁹⁽¹¹⁾-pregnadiene-3,20-dione for 6,14-dimethyl-21-diazo-A-nor-Δ⁵-pregnene - 3,11,20 - trione yields 6,14-dimethyl-A-nor-Δ⁵,⁹⁽¹¹⁾-pregnadiene-3,20-dione.

Example 21.—6,14-dimethyl-A-nor-Δ⁵-pregnene-11β-ol-3,20-dione

Following the procedure set forth in Example 19 but substituting an equivalent amount of 6,14-dimethyl-21-diazo-A-nor-Δ⁵-pregnene-11β-ol-3,20-dione for 6,14-dimethyl-21-diazo-A-nor-Δ⁵-pregnene-3,11,20-trione yields 6,14-dimethyl-A-nor-Δ⁵-pregnene-11β-ol-3,20-dione.

Example 22.—6,14-dimethyl-A-nor-Δ⁵-pregnene-21-ol-3,11,20-trione-21-acetate

A solution of 6,14-dimethyl-21-diazo-A-nor-Δ⁵-pregnene-3,11-20-trione in glacial acetic acid is heated on the steam bath for ½ hour. Water and chloroform are added and the resulting chloroform extract washed with sodium bicarbonate and water, dried over sodium sulfate and the solvent evaporated to dryness in vacuo. The residual crystals obtained after recrystallization from methanol yield 6,14-dimethyl-A-nor - Δ⁵ - pregnene-21-ol-3,11,20-trione-21-acetate.

Similarly, substituting propionic acid, butyric acid or other fatty acids for the acetic acid of Example 22 there are obtained the corresponding propionic, butyric and other esters of 6,14-dimethyl-A-nor-Δ⁵-pregnene-21-ol-3,11,20-trione.

Example 23.—6,14-dimethyl-A-nor-Δ⁵,⁹⁽¹¹⁾-pregnadiene-21-ol-3,20-dione-21-acetate Following the procedure set forth in Example 22 but substituting 6,14-dimethyl-21-diazo-A-nor-Δ⁵,⁹⁽¹¹⁾-pregnadiene-3,20-dione for 6,14-dimethyl-21-diazo-A-nor-Δ⁵-pregnene-3,11,20-trione yields 6,14-dimethyl-A-nor-Δ⁵,⁹⁽¹¹⁾-pregnadiene-21-ol-3,20-dione-21-acetate.

Example 24.—6,14-dimethyl-A-nor-Δ⁵-pregnene-11β,21-diol-3,20-dione-21-acetate

Following the procedure set forth in Example 22 but substituting 6,14-dimethyl-21-diazo-A-nor-Δ⁵-pregnene-11β-ol-3,20-dione for 6,14-dimethyl-21-diazo-A-nor-Δ⁵-pregnene-3,11,20-trione yields 6,14-dimethyl-A-nor-Δ⁵-pregnene-11β,21-diol-3,20-dione-21-acetate.

Example 25.—6,14-dimethyl-A-nor-Δ⁵-pregnene-21-ol-3,11,20-trione

To a solution of 6,14-dimethyl-A-nor-Δ⁵-pregnene-21-ol-3,11,20-trione-21-acetate in methanol is added with stirring under nitrogen oxygen-free potassium carbonate. After 2 hours at room temperature glacial acetic acid is added and after the addition of water the methanol is removed in vacuo. The mixture is then extracted with chloroform, the chloroform extract washed with water, dried over sodium sulfate and evaporated to dryness in vacuo. The resultant crystallized 6,14-dimethyl-A-nor-Δ⁵-pregnene-21-ol-3,11,20-trione is then recrystallized from acetone hexane.

Example 26.—6,14-dimethyl-A-nor-Δ⁵,⁹⁽¹¹⁾-pregnene-21-ol-3,20-dione

Following the procedure set forth in Example 25 but substituting 6,14-dimethyl-A-nor-Δ⁵,⁹⁽¹¹⁾-pregnadiene-21-ol-3,20-dione-21-acetate for 6,14-dimethyl-A-nor-Δ⁵-pregnene-21-ol-3,11,20-trione-21-acetate there is obtained 6,14-dimethyl-A-nor-Δ⁵,⁹⁽¹¹⁾-pregnene-21-ol-3,20-dione.

Example 27.—6,14-dimethyl-A-nor-Δ⁵-pregnene-11β,21-diol-3,20-dione

Following the procedure set forth in Example 25 but substituting 6,14-dimethyl-A-nor-Δ⁵-pregnene-11β,21-diol-3,20-dione 21-acetate for 6,14-dimethyl-A-nor-Δ⁵-pregnene-21-ol-3,11,20-trione - 21 - acetate there is obtained 6,14 - dimethyl-A-nor-Δ⁵-pregnene-11β,21-diol-3,20-dione.

The invention may be variously otherwise embodied within the scope of the appended claims.

What is claimed is:
1. A compound selected from the group consisting of steroids of the formula

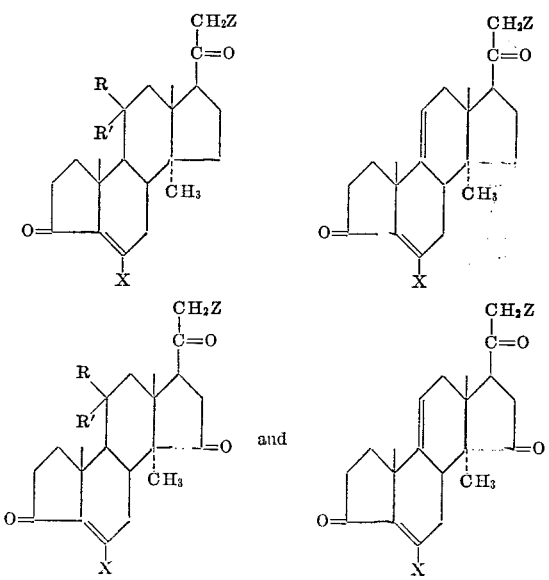

wherein X is lower alkyl; R is hydrogen; R' is hydroxy; and together R and R' is oxo (O=); and Z is selected from the group consisting of hydrogen, hydroxy, halogen and acyloxy wherein the acyl radical is of a hydrocarbon carboxylic acid of less than twelve carbon atoms.

References Cited
UNITED STATES PATENTS 3,170,919  2/1965  Fried _____ 260—586

LORRAINE A. WEINBERGER, *Primary Examiner.*
RICHARD K. JACKSON, *Examiner.*
V. GARNER, *Assistant Examiner.*